(12) United States Patent
Rekimoto (10) Patent No.: US 7,289,800 B2
(45) Date of Patent: Oct. 30, 2007

(54) PORTABLE ELECTRONIC DEVICE AND WIRELESS CONNECTION CONTROL METHOD THEREFOR

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 11/106,923

(22) Filed: Apr. 15, 2005

(65) Prior Publication Data
US 2006/0109143 A1 May 25, 2006

(30) Foreign Application Priority Data
May 7, 2004 (JP) .......................... P2004-138910

(51) Int. Cl.
*H04Q 7/20* (2006.01)
(52) U.S. Cl. .................. 455/420; 455/418; 455/562.1; 340/998; 701/207
(58) Field of Classification Search ................ 455/420, 455/419, 418, 562.1; 340/988, 995.19, 998; 701/209, 207
See application file for complete search history.

(56) References Cited

U.S. PATENT DOCUMENTS 6,909,891 B2 * 6/2005 Yamashita et al. .......... 455/420
2003/0164778 A1 * 9/2003 Muramatsu ................. 340/988
2003/0216139 A1 * 11/2003 Olson et al. ................ 455/419
2004/0033808 A1 * 2/2004 Rorabaugh ............... 455/456.1
2004/0180672 A1 * 9/2004 Hirano et al. ............ 455/456.1
2004/0225437 A1 * 11/2004 Endo et al. ................. 701/209
2004/0249568 A1 * 12/2004 Endo et al. ................. 701/209

FOREIGN PATENT DOCUMENTS

JP        2002-204239         7/2002

* cited by examiner

*Primary Examiner*—Danh Le
(74) *Attorney, Agent, or Firm*—Bell, Boyd & Lloyd LLP

(57) ABSTRACT

A portable electronic device and a wireless connection control method are provided. The portable electronic device includes an azimuth detecting section that measures an absolute azimuth of a device main body; a radio communication section that performs radio communication with connection object electronic devices; and a control section that performs control for establishing connection by the radio communication with the connection object electronic devices using the radio communication section, wherein the control section performs control for specifying a connection object to establish connection on the basis of absolute azimuth information detected by the azimuth detecting section and reception information received from the connection object electronic devices by the radio communication section.

9 Claims, 7 Drawing Sheets

PORTABLE ELECTRONIC DEVICE AND WIRELESS CONNECTION CONTROL METHOD THEREFOR

CROSS-REFERENCES TO RELATED APPLICATIONS

The present application claims priority to Japanese Patent Application No. P2004-138910 filed in the Japanese Patent Office on May 7, 2004, the entire contents of which being incorporated herein by reference.

BACKGROUND OF THE INVENTION

The present invention relates to a portable electronic device and a wireless connection control method for the portable electronic device.

In recent years, cellular phones, Persona Digital Assistants (PDAs), and the like have spread rapidly. As a result, users have a lot of opportunities to exchange information among a plurality of such devices.

In the past, when information is exchanged in this way, devices are connected to one another via cradles or cables or infrared ray transmitting and receiving sections of the devices are placed to be opposed to one another to transmit and receive information.

However, wire connection is not only complicated but also inconvenient because connectors matching models of the respective devices have to be prepared. In addition, when infrared rays are used, for example, if a user carelessly passes across a transmission path of the infrared rays to block the infrared rays, communication is cut off.

Thus, electronic devices including a radio communication function represented by the Institute of Electrical and Electronics Engineers (IEEE) 802.11 communication standard and the Bluetooth (registered trademark) communication standard are spreading.

However, when communication is performed by radio, a user has to input an address of a device with which the user communicates. Usually, since the user does not memorize addresses of devices, the user has to prepare an address table in advance and input an address manually with reference to the address table. As a result, the radio communication is low in operability and is inconvenient. Therefore, for example, even when information is exchanged between a PDA held by the user and a device that is set in front of the user, the user has to input an address of the partner device. Therefore, it is difficult to exchange information promptly.

Information that needs confidentiality such as information on privacy is also transmitted and received among the devices having the radio communication function. Thus, it is necessary to take security measures for preventing a third party from tapping and tampering such information or preventing illegal intrusion into a network.

For example, in the IEEE802.11 communication standard, a user registers a secret key called a Wired Equivalent Privacy (WEP) key in a device for communication in advance and causes the device to perform encrypted communication using the WEP key to thereby secure security of the communication. In addition, the user issues a digital certificate in advance and causes the device to authenticate a communication partner device using the certificate at the start of communication to thereby judge whether the communication partner device is a legal device and secure security of the communication.

Incidentally, if such registration of key information and issuance of a certificate are typically performed in advance to secure security, it may be impossible to cope with switching of a connection object of the radio communication promptly. It may be impossible to cope with temporary connection or the like. For example, two portable devices are temporarily connected wirelessly to transfer a certain file, a digital camera are temporarily connected to a printer set in a shop wirelessly to print photographs, or a video camera and a cellular phone are temporarily connected to remote control the video camera wirelessly using the cellular phone.

Thus, in order to easily specify a connection object and start radio communication with the specified device promptly, a cellular phone incorporating an RF tag is brought close to a personal computer incorporating a reader writer to cause the RF tag and the reader writer to transmit and receive identification information of the cellular phone and the personal computer. Thereafter, Bluetooth communication is established between the cellular phone and the personal computer on the basis of the transmitted and received identification information.

It has also been proposed to cause the two devices to share a secret key according to short-distance radio communication by the RF tag and the reader writer or short-distance radio communication by infrared ray modules provided in both the devices. Therefore, for example, if the Bluetooth communication is encrypted using the secret key transmitted and received by the short-distance radio communication, a user can promptly start the Bluetooth communication, for which security is secured, simply by bringing both the devices close to each other (see, for example, JP-A-2002-204239).

However, in order to cause both the devices to transmit and receive the identification information and the secret key, it is necessary to provide the RF tag and the reader writer or short-distance radio communication modules such as the infrared ray modules in both the devices separately from radio communication modules that are capable of performing communication even in locations relatively distant from each other in the Bluetooth communication or the like. The RF tag and the infrared ray modules, and the like are provided simply for establishing the Bluetooth communication or the like by the radio communication modules provided separately. Nevertheless, in order to start the Bluetooth communication or the like promptly simply by bringing the devices close to each other, it is necessary to prepare the RF tag, the infrared ray modules, and the like, which increases cost.

Incidentally, there is known a technique (an electronic compass) for measuring a direction of a device by detecting earth magnetism using a Hall element and amorphous magnetic metal. If the electronic compass is used, it is possible to make a direction that a portable device faces and a top on a map to coincide with each other when the map is displayed on the portable device.

In addition, there is known a technique for estimating a position of a portable device by measuring intensity of ratio output, which is emitted by the portable device, from plural base stations. It is possible to recognize a rough distance between devices by measuring intensity of radio waves transmitted from the devices each other. This makes it possible to realize operating means for "selecting a device in a short distance as a wireless connection object."

According to this system, it is possible to directly designate a device, which will be a connection object, without depending on indexes such as an IP address and a device name. In other words, for example, when a user wishes to print a photograph stored in a portable device using a printer, the user brings the portable device close to the printer and starts wireless connection. Since a printer close to the portable device is selected as a connection object, it is unnecessary to check and designate a machine name and an IP address corresponding to the printer.

However, when there are plural devices near the portable device, it is not always possible to identify the devices correctly. For example, when different printers are present at substantially the same distances from the portable device, it is likely that the wireless connection is started with a printer with which the user does not intend to start the wireless connection.

SUMMARY OF THE INVENTION

The present invention relates to a portable electronic device and a wireless connection control method for the portable electronic device.

Thus, it is desirable to provide a portable electronic device and a wireless connection control method that can select a connection destination more appropriately among devices at substantially the same distances or in substantially the same locations.

According to an embodiment of the invention, in addition to a distance between a portable electronic device and a connection object portable electronic device based on reception intensity at the time when the portable electronic device performs wireless communication with the connection object electronic device, a connection destination is selected more appropriately among devices at substantially the same distance or in substantially the same locations by using absolute azimuth information of a device. The absolute azimuth information is obtained by an electronic compass, that is, an azimuth detecting section.

A portable electronic device according to the embodiment includes: an azimuth detecting section that measures an absolute azimuth of a device main body; a radio communication section that performs radio communication with a connection object electronic device; and a control section that performs control for establishing connection by the radio communication with the connection object electronic device using the radio communication section. The control section performs control for specifying a connection object to establish connection on the basis of absolute azimuth information detected by the azimuth detecting section and reception information received from the connection object electronic device by the radio communication section.

In the portable electronic device according to the embodiment, for example, the control section performs control for specifying connection candidates on the basis of the reception information received from the connection object electronic device by the radio communication section and specifying a connection object from the connection candidates to establish connection on the basis of azimuth information of the connection object electronic device included in the reception information and the absolute azimuth information detected by the azimuth detecting section.

A wireless connection control method according to another embodiment of the invention is a wireless connection control method for a portable electronic device for wirelessly connecting a portable electronic device to a connection object electronic device, wherein the wireless connection control method performs control for: performing radio communication with the connection object electronic device; specifying connection candidates on the basis of received reception information; and specifying a connection object from the connection candidates to establish connection on the basis of azimuth information of the connection object electronic device included in the reception information and absolute azimuth information of a main body of the portable electronic device.

Additional features and advantages of the present invention are described in, and will be apparent from, the following Detailed Description of the Invention and the figures.

DETAILED DESCRIPTION OF THE INVENTION

The present invention relates to a portable electronic device and a wireless connection control method for the portable electronic device.

Embodiments of the present invention will be hereinafter explained in detail with reference to the accompanying drawings.

Figure 1:
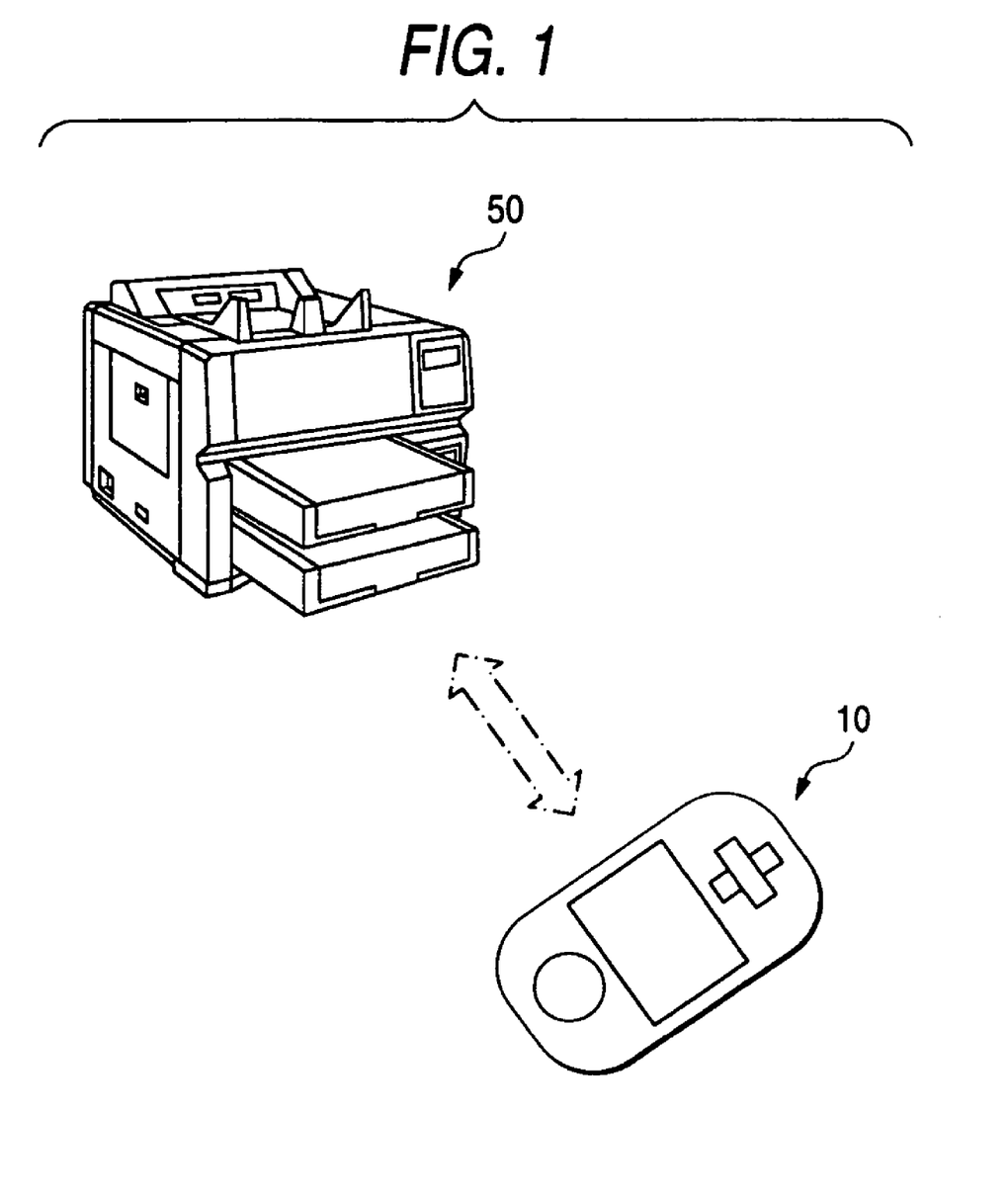
FIG. 1 is a diagram schematically showing an example of wireless connection of a portable electronic device according to an embodiment of the present invention.

For example, as shown in FIG. 1, the invention is applied to a portable electronic device 10 that is used in wireless connection with another electronic device 50 such as a printer that is connection object.

Figure 2:
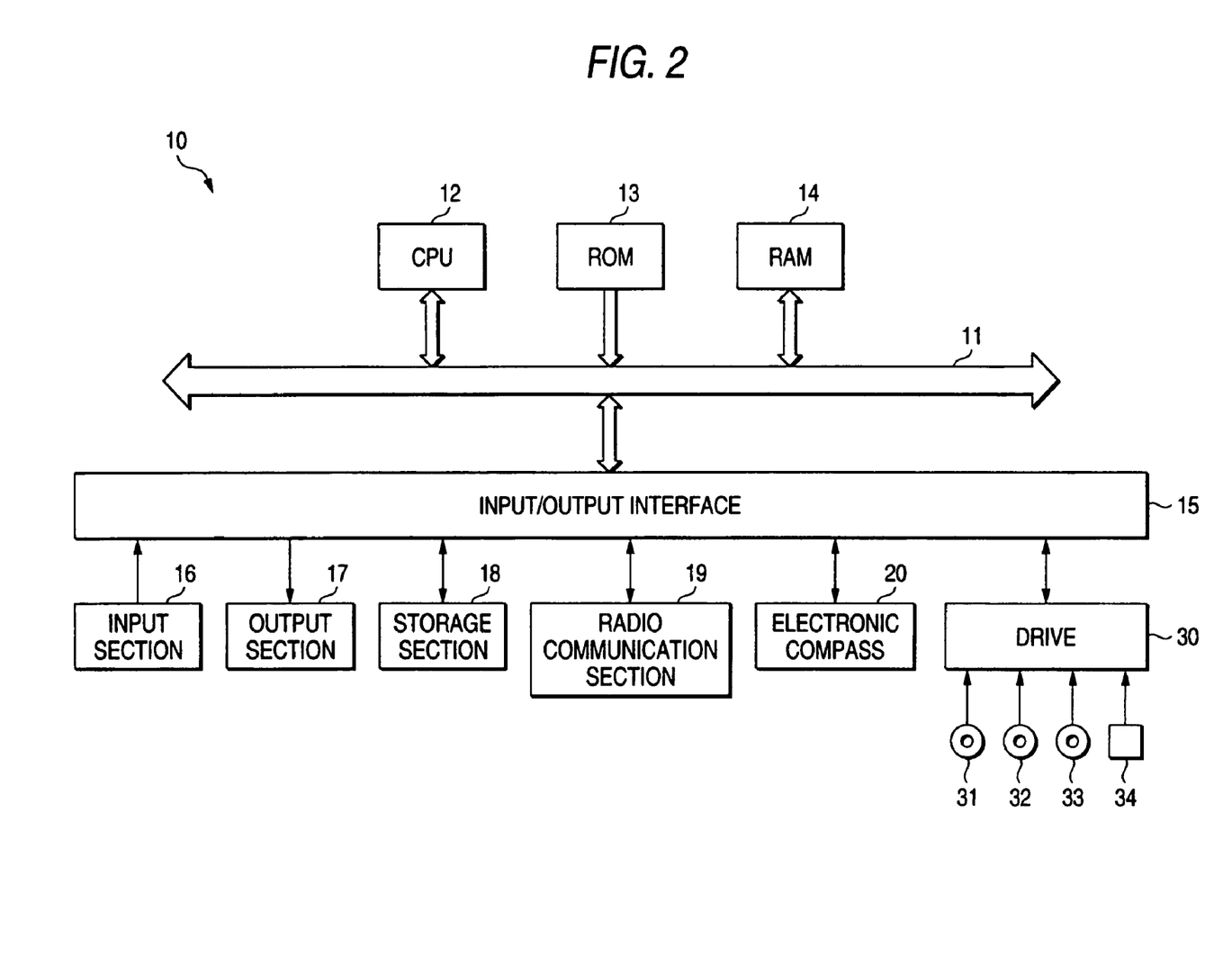
FIG. 2 is a block diagram showing a structure of the portable electronic device.

As shown in FIG. 2, this portable electronic device 10 includes a Central Processing Unit (CPU) 12, a Read Only Memory (ROM) 13, a Random Access Memory (RAM) 14, and an input/output interface 15 that are connected to one another via a bus 11.

In the portable electronic device 10, the CPU 12 executes various kinds of processing in accordance with a program loaded to the RAM 14 from the ROM 13 or a storage section 18. For example, data necessary for the CPU 12 to execute the various kinds of processing are also stored in the RAM 14 according to circumstances.

An input section 16, an output section 17, and a storage section 18 are connected to the input/output interface 15. The input section 16 includes various buttons and a jog dial or a touch panel provided to be superimposed on, for example, a liquid crystal display (LCD) that constitutes the output section 17. The output section 17 includes a display section, which has an LCD or the like, and a speaker. The storage section 18 includes a flash memory.

A radio communication section 19, which is a radio communication module conforming to the IEEE802.11 communication standard or the Bluetooth communication standard, is also connected to the input/output interface 15. The radio communication section 19 performs radio communication conforming to the IEEE802.11 communication standard with not-shown other electronic devices in accordance with control performed by the CPU 12 via the bus 11 and the input/output interface 15.

Moreover, an electronic compass 20 is connected to the input/output interface 15 as an azimuth detecting section for measuring an absolute azimuth of the portable electronic device 10.

A drive 30 is also connected to the input/output interface 15 when it is necessary. A magnetic disk 31, an optical disk 32, a magneto-optical disk 33, a semiconductor memory 34, or the like are mounted on the drive 30 according to circumstances.

In the portable electronic device 10 having such a structure, the radio communication section 19 has a function of measuring field intensities of radio packets transmitted from connection object electronic devices 50. The CPU 12 can measure rough distances between the portable electronic device 10 and the connection object electronic devices 50 on the basis of the field intensities of the radio packets measured by the radio communication section 19.

The electronic compass 20 measures an absolute azimuth (a direction relative to the axis of the Earth) of the portable electronic device 10 and gives absolute azimuth information to the CPU 12.

The CPU 12 measures rough distances between the portable electronic device 10 and the connection object electronic devices 50 on the basis of reception information received from the connection object electronic devices 50 by the radio communication section 19, for example, the field intensities of the radio packets. Then, the CPU 12 specifies the electronic devices 50 within a predetermined distance range from the portable electronic device 10 as connection candidates. Further, the CPU 12 specifies a connection object from the connection candidate electronic devices 50 on the basis of the reception information received from the connection candidate electronic devices 50 by the radio communication section 19, that is, azimuth information of the connection candidate electronic devices 50 included in the radio packet and the absolute azimuth information detected by the electronic compass 20 to establish connection.

Figure 3:
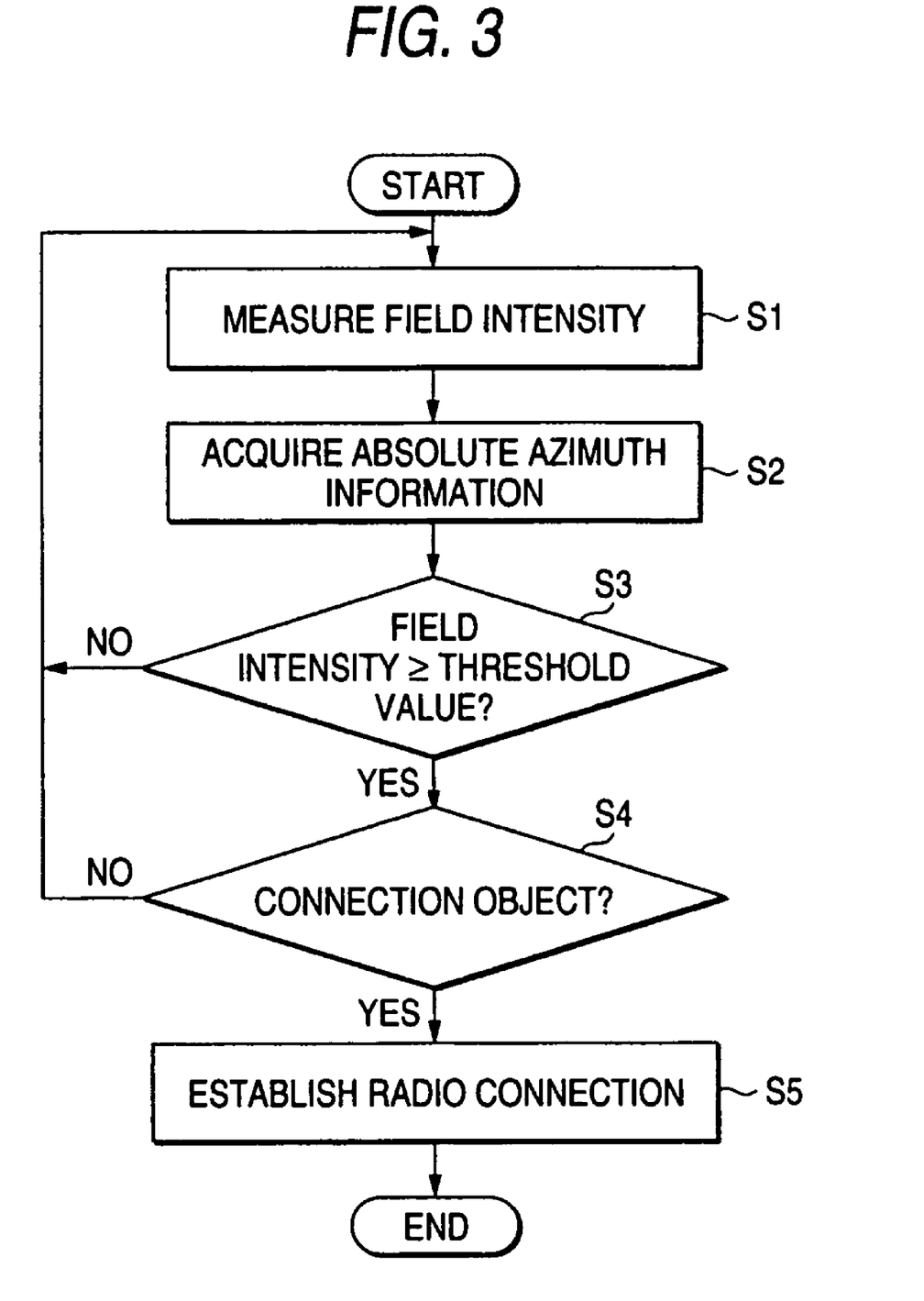
FIG. 3 is a flowchart showing a procedure for establishing wireless connection in the portable electronic device.

In the portable electronic device 10, in establishing wireless connection, as shown in a flowchart in FIG. 3, first, the radio communication section 19 measures field intensities of radio packets received from connection object electronic devices (step S1). Then, the electronic compass 20 measures an absolute azimuth of the portable electronic device 10 to obtain absolute azimuth information (step S2).

Next, the CPU 12 judges whether the field intensities are equal to or higher than a threshold value (step S3). Consequently, the CPU 12 specifies the electronic devices 50 within a predetermined distance range from the portable electronic device 10 as connection objects.

The CPU further judges whether an electronic device is a connection object electronic device on the basis of the azimuth information of the connection candidate electronic devices 50 included in the radio packets received from the connection candidate electronic devices 50 and the absolute azimuth information detected by the electronic compass 20 (step S4). In other words, the CPU 12 specifies the electronic device 50 located to face a predetermined direction with respect to the portable electronic device 10, for example, to be opposed to the portable electronic device 10.

Then, the CPU establishes wireless connection to the connection object electronic device 50 specified from the connection candidates as described above (step S5).

Figure 4:
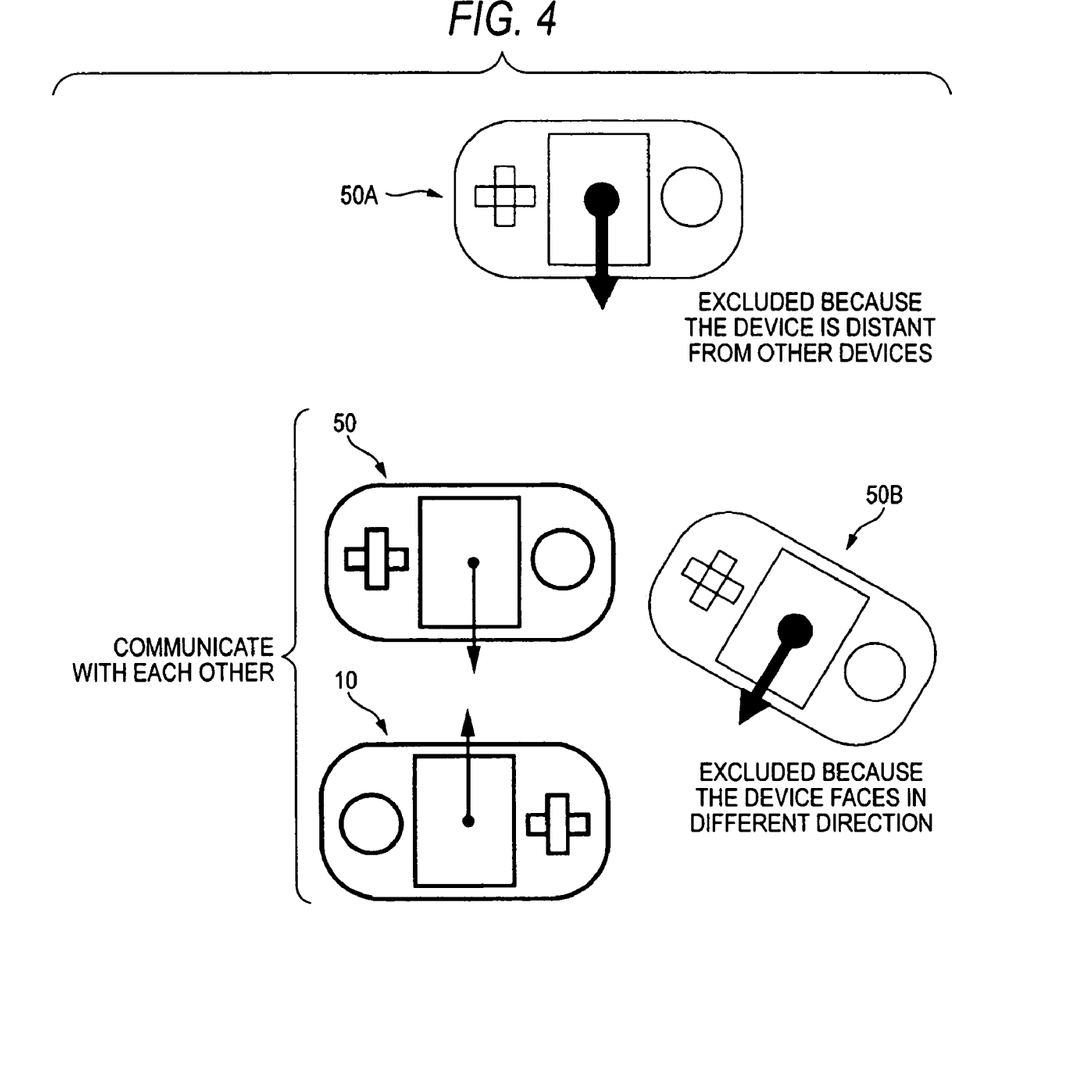
FIG. 4 is a diagram schematically showing an example of wireless connection between two portable electronic devices.

In this way, the portable electronic device 10 has the function of performing wireless communication with connection object electronic devices, specifying connection candidates on the basis of the received reception information, and specifies a connection object from the connection candidates on the basis of azimuth information of the connection object electronic devices included in the reception information and absolute azimuth information of the main body of the portable electronic device 10 to establish connection. In the portable electronic device 10, for example, as shown in FIG. 4, in connecting two devices wirelessly, a device 50A located in the distance is excluded from connection objects because the device 50A is distant from the portable electronic device 10. In addition, a device 50B, which is located near the portable electronic device 10 but faces a direction different from a direction of the portable electronic device 10, is also excluded from the connection objects. The device 50 located to be opposed to the portable electronic device 10 is specified as a connection object device to establish connection accurately.

Figure 5:
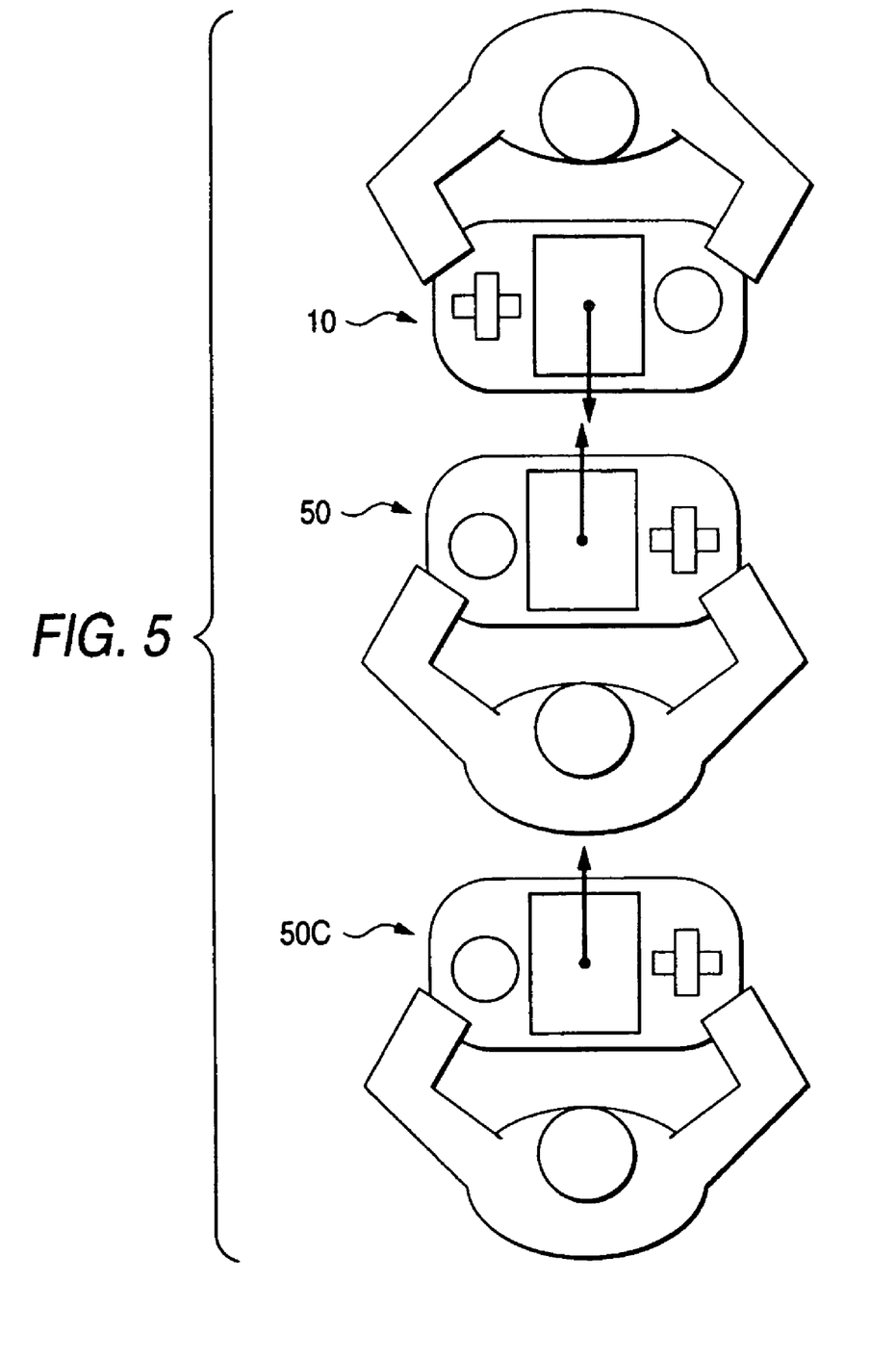
FIG. 5 is a diagram schematically showing an example of wireless connection between two portable electronic devices.

Therefore, even when there are plural devices, which will be connection object, around the portable electronic device 10, a user can designate a target device with intuitive operation of adjusting a direction of the device. For example, as shown in FIG. 5, when the user operates a device as in start of a game device, the user can visually confirm a device 50 of a partner facing the user and exclude a device 50C located behind the user from connection objects.

In addition, the portable electronic device 10 can grasp a positional relations among the connection object electronic devices 50 on the basis of the absolute azimuth information of the portable electronic device 10 detected by the electronic compass 20 and the azimuth information of the connection object electronic device 50 included in the received reception information. Thus, in connecting two or more devices in a game of cards or a mahjong game played by four people, it is possible to reflect directions of the connected devices on an order of seats in the game. Since an actual positional relation among the users and an order in the game correspond to each other spatially, it is easy to grasp opponents in the game.

Figure 6:
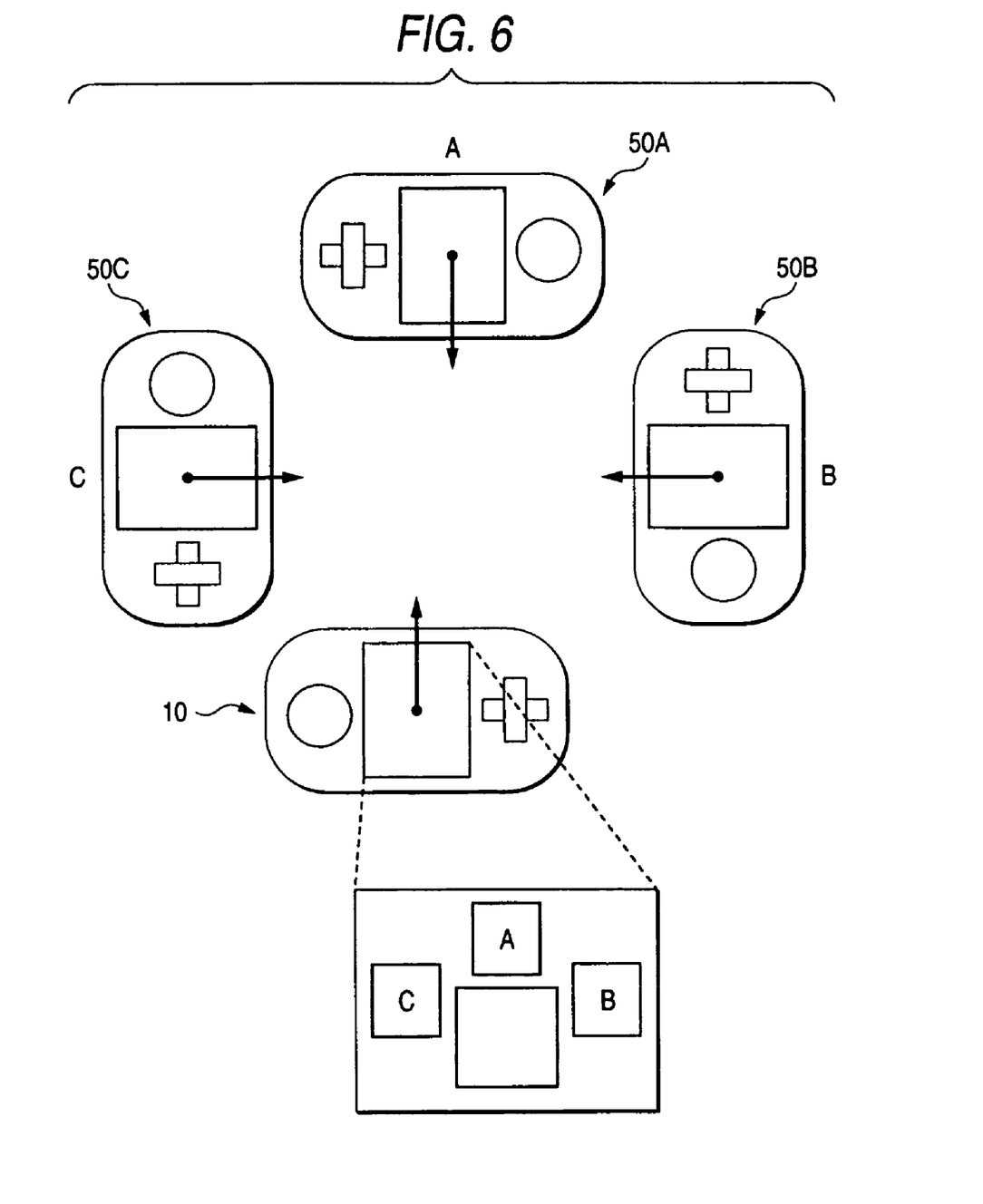
FIG. 6 is a diagram schematically showing an example of wireless connection among four portable electronic devices.

For example, as shown in FIG. 6, in the case of the mahjong game, a dealer calls a game and three players turn devices 10A, 10B, and 10C to a device 10 of the dealer to start connection. As a result, it is possible to automatically set an order of seats on a mahjong table such that an actual order of seats is reflected on the order of seats on the mahjong table.

Figure 7:
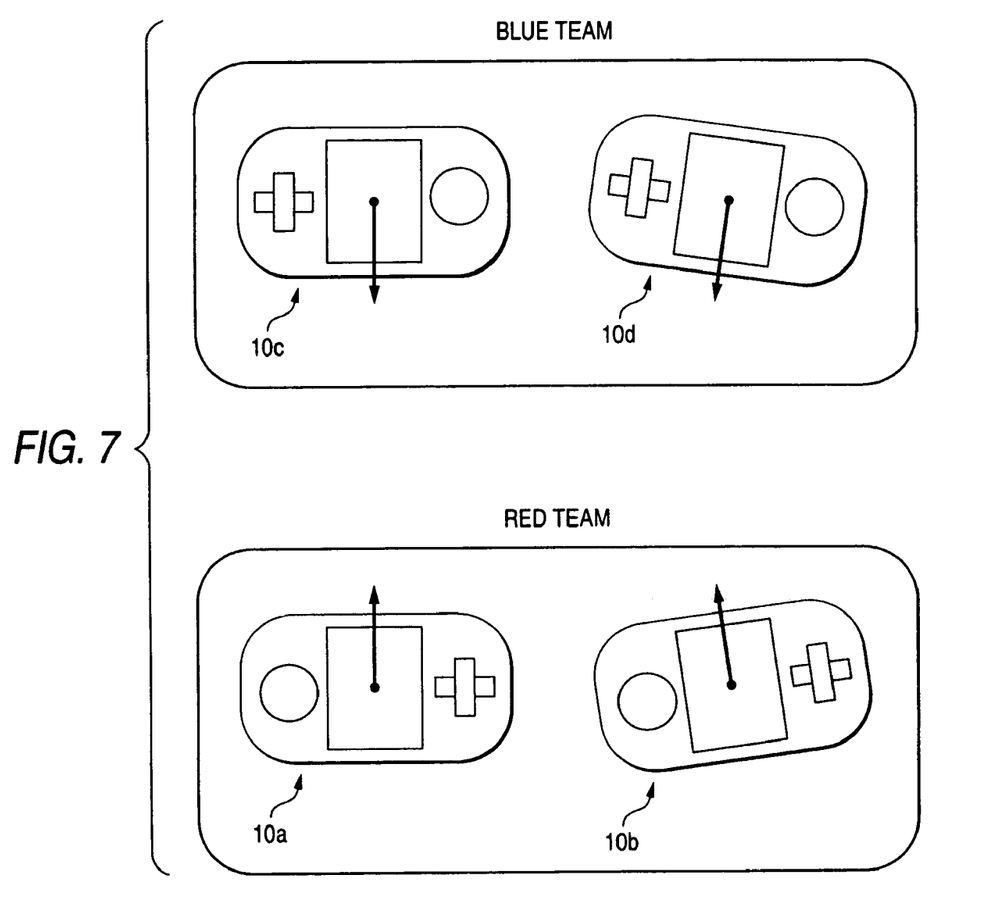
FIG. 7 is a diagram schematically showing an example of wireless connection in which plural portable electronic devices form teams.

In addition, as shown in FIG. 7, players using connected devices 10a, 10b, 10c, and 10d can play a game in two teams (a blue team and a red team).

An example shown in FIG. 7 assumes, for example, a soccer game. In this case, it is possible to make an arrangement such that the players facing the same direction belong to the same team naturally. In changing the formation of the teams, directions of the users only have to be changed.

According to the embodiments of the invention, it is possible to designate an electronic device, to which a user desires to connect a portable electronic device, from devices around the portable electronic device by performing control for performing radio communication with the connection object electronic device, specifying connection candidates on the basis of received reception information, and specifying a connection object from the connection candidates to establish connection on the basis of azimuth information of the connection object electronic device included in the reception information and absolute azimuth information of a main body of the portable electronic device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A portable electronic device comprising:
azimuth detecting means that measures an absolute azimuth of a device main body;
radio communication means that performs radio communication with connection object electronic devices; and
control means that performs control for establishing connection by the radio communication with the connection object electronic devices using the radio communication means, wherein
the control means performs control for specifying a connection object to establish connection based on absolute azimuth information detected by the azimuth detecting means and reception information received from the connection object electronic devices by the radio communication means wherein the control means performs control for specifying connection candidates based on the reception information received from the connection object electronic devices by the radio communication means and specifying a connection object from the connection candidates to establish connection based on azimuth information of the connection object electronic devices included in the reception information and the absolute azimuth information detected by the azimuth detecting means.

2. The portable electronic device of claim 1, further comprising:
a distance determination section configured to determine an approximate distance between the portable electronic device and the first object electronic device.

3. The portable electronic device of claim 2, wherein the control section specifies the first object electronic device as the connection object if the approximate distance is below a threshold and the absolute azimuth has a relationship with the second absolute azimuth.

4. The portable electronic device of claim 3, wherein the relationship is that the absolute azimuth and the second absolute azimuth are approximately opposite.

5. The portable electronic device of claim 1 wherein the reception information includes an approximate distance between the portable electronic device and the first object electronic device.

6. The portable electronic device of claim 5, wherein the control section specifies the first object electronic device as the connection object if the approximate distance is below a threshold and the absolute azimuth has a relationship with the second absolute azimuth.

7. The portable electronic device of claim 6, wherein the relationship is that the absolute azimuth and the second absolute azimuth are approximately opposite.

8. A portable electronic device comprising:
an azimuth detecting section that measures an absolute azimuth of a device main body;
a radio communication section that performs radio communication with connection object electronic devices; and
a control section that performs control for establishing connection by the radio communication with the connection object electronic devices using the radio communication section, wherein
the control section performs control for specifying a connection object to establish connection on the basis of absolute azimuth information detected by the azimuth detecting section and reception information received from the connection object electronic devices by the radio communication section wherein the control section performs control for specifying connection candidates based on the reception information received from the connection object electronic devices by the radio communication section and specifying a connection object from the connection candidates to establish connection based on azimuth information of the connection object electronic devices included in the reception information and the absolute azimuth information detected by the azimuth detecting section.

9. A wireless connection control method for a portable electronic device for wirelessly connecting a portable electronic device to connection object electronic devices, the method comprising:
performing radio communication with the connection object electronic devices;
performing control for specifying connection candidates based on received reception information received from the connection object electronic devices via radio communication; and
performing control for specifying a connection object from the connection candidates to establish connection based on azimuth information of the connection object electronic devices included in the reception information and absolute azimuth information of a main body of the portable electronic device detected by an azimuth detecting section of the portable electronic device.

* * * * *